United States Patent [19]

Yakame

[11] Patent Number: 4,930,023
[45] Date of Patent: May 29, 1990

[54] HALFTONE DOT GENERATOR USING GRAINED SCREEN PATTERNS

[75] Inventor: Kazunori Yakame, Kyoto, Japan

[73] Assignee: Dainippon Screen Mfg. Co. Ltd., Japan

[21] Appl. No.: 315,907

[22] Filed: Feb. 27, 1989

[30] Foreign Application Priority Data

Mar. 1, 1988 [JP] Japan .................................. 63-49343

[51] Int. Cl.$^5$ .............................................. H04N 1/40
[52] U.S. Cl. .................................. 358/460; 358/298; 358/457
[58] Field of Search ............... 358/298, 455, 456, 457, 358/458, 459, 460

[56] References Cited

U.S. PATENT DOCUMENTS

| | | | |
|---|---|---|---|
| 4,340,912 | 7/1982 | Troxel | 358/459 |
| 4,673,971 | 6/1987 | Ikuta et al. | 358/460 |
| 4,680,596 | 7/1987 | Logan | 358/456 |
| 4,700,235 | 10/1987 | Gall | 358/298 |

*Primary Examiner*—James J. Groody
*Assistant Examiner*—Randall S. Svihla
*Attorney, Agent, or Firm*—Ostrolenk, Faber, Gerb & Soffen

[57] ABSTRACT

A plurality of grained screen patterns that are different from each other are previously stored in a grained screen pattern memory. The grained screen patterns are accessed at random in response to an address signal (AGP) generated in a random number generator. An original image data is compared with the random arrangement of the grained screen patterns for each pixel, to produce a halftone dot image. The halftone dot image thus obtained has no periodic distribution of density, such as a moire.

12 Claims, 10 Drawing Sheets

| A7 | B4 | 02 | 43 | F3 | 31 | B8 | 7F | 5E | 61 | 49 | 16 | 7D | F2 | A6 | C7 |
|----|----|----|----|----|----|----|----|----|----|----|----|----|----|----|----|
| 10 | 86 | D0 | E0 | 89 | E7 | F9 | A6 | 97 | 18 | 83 | 2F | D3 | 31 | 4E | 6F |
| 75 | 95 | 05 | 7E | D1 | 53 | 05 | 70 | D4 | 7A | CA | BD | DC | 8A | 38 | 61 |
| E4 | C0 | 6F | 2D | 44 | 5B | D3 | A3 | 48 | E9 | D4 | 04 | C4 | F3 | B8 | F8 |
| D8 | 79 | FC | 76 | 6F | 3F | B2 | B7 | D5 | 61 | 5C | 85 | B4 | 33 | E1 | 76 |
| 01 | AA | 6F | 71 | D8 | 49 | 0F | 6E | 7F | B6 | 1B | 51 | 8B | 5D | 95 | 88 |
| B4 | 8A | E4 | EF | 3E | E8 | 21 | CC | A5 | BE | 64 | 5A | 0B | 51 | 3F | 0C |
| D1 | 90 | 79 | AA | 22 | DA | 3E | AE | 01 | 25 | D7 | 30 | DD | 4B | 57 | 40 |
| AA | 35 | 60 | 21 | 5E | B1 | C5 | 40 | F0 | B4 | 3E | 02 | D0 | 3D | 1B | 41 |
| 3A | E0 | 60 | 4A | A4 | 45 | A8 | B2 | B6 | E1 | 70 | 8F | C5 | 46 | 18 | F2 |
| A2 | AB | B0 | 03 | 23 | 6A | 68 | 9F | CF | 96 | B5 | BD | 3C | 43 | BF | 9E |
| 03 | 60 | A5 | 8B | B0 | D4 | CA | F9 | 69 | 2D | A2 | D3 | 23 | 16 | 3D | A6 |
| 4D | C0 | A8 | E2 | 72 | 23 | 42 | A2 | 16 | D0 | A8 | 28 | 4C | EF | 4D | 08 |
| A2 | B3 | 4E | 2E | CC | 63 | E8 | 88 | E8 | 98 | 70 | 55 | C5 | CC | FD | 00 |
| 47 | 99 | 89 | 18 | 68 | 26 | 3B | 56 | 21 | 5A | B0 | 01 | 19 | C7 | 84 | 72 |
| 49 | 01 | 0B | 7D | 61 | 51 | F9 | 84 | 86 | 8E | 32 | AC | A1 | 07 | D7 | D4 |

HALFTONE DOT GENERATOR USING GRAINED SCREEN PATTERNS

BACKGROUND OF THE INVENTION

1. Field of the Invention

The present invention relates to a halftone dot generator, and more particularly to a technique for recording a halftone dot image with a plurality of grained screen patterns.

2. Description of Background Art

As well known in the art, an ordinary halftone dot generator generates a screen pattern having a single peak of threshold values. The screen pattern is applied to every halftone dot, and therefore, a periodic distribution in density such as a moire often appears on a reproduced halftone dot image.

In order to prevent or suppress the periodic distribution, a grained screen pattern is often used in image reproduction. However, even if a grained screen pattern is employed, the periodic distribution in density cannot be perfectly suppressed on a uniform color region of the reproduced image, such as a region of a blue sky. This is because the grained screen pattern is used in common to all areas arrayed at a screen pitch. Although the periodic distribution can be further suppressed when the grained screen pattern is so constructed that the screen pitch is longer than the size of the uniform color region, such a grained screen pattern has large amount of data, and a screen pattern memory having large capacity should be prepared.

SUMMARY OF THE INVENTION

The present invention is intended for a method of producing a halftone dot image on the basis of original image data expressing an original image. According to the present invention, the method comprises the steps of: (a) preparing grained screen patterns being different from each other; (b) arranging the grained screen patterns in a random order, to obtain a random arrangement of the grained screen patterns; (c) comparing the original image data with the random arrangement of the grained screen patterns for each pixel; to thereby generate a halftone dot signal, and (d) producing a halftone dot image on the basis of the halftone dot signal.

In an aspect of the present invention, the halftone dot image is produced through a combination of a main scanning and a subscanning on an image plane, and the halftone dot image has a plurality of pixels arrayed along a main scanning direction and a subscanning direction.

Preferably, the grained screen patterns are assigned to respective parts of the image plane at random in both of the main scanning direction and the subscanning direction, in order to obtain the random arrangement of the grained screen patterns.

In an apparatus for producing the halftone dot image, the grained screen patterns are stored in a memory. The grained screen patterns are read out in a random order, whereby the random arrangement of the grained screen patterns is obtained. The apparatus may include another memory in which a single-peak screen pattern is stored. A periodic arrangement obtained by repeatedly arranging the single-peak screen pattern is generated, and either of the random arrangement and the periodic arrangement is employed for generating a screen pattern signal.

In another aspect of the present invention, a halftone dot generator for generating the halftone dot signal is provided, where the random arrangement is generated in time series.

Since the original image data is compared with the random arrangement, an undesired periodicity hardly appears on the halftone dot image.

Accordingly, an object of the present invention is to eliminate an undesired periodic distribution of density from a halftone dot image.

Another object of the present invention is to substantially prevent the undesired periodic distribution without requiring a screen pattern memory with large capacity.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram showing a distribution of threshold values in a grained pattern.

DESCRIPTION OF THE PREFERRED EMBODIMENTS

A. Entire Structure and Schematic Operation

Figure 1:
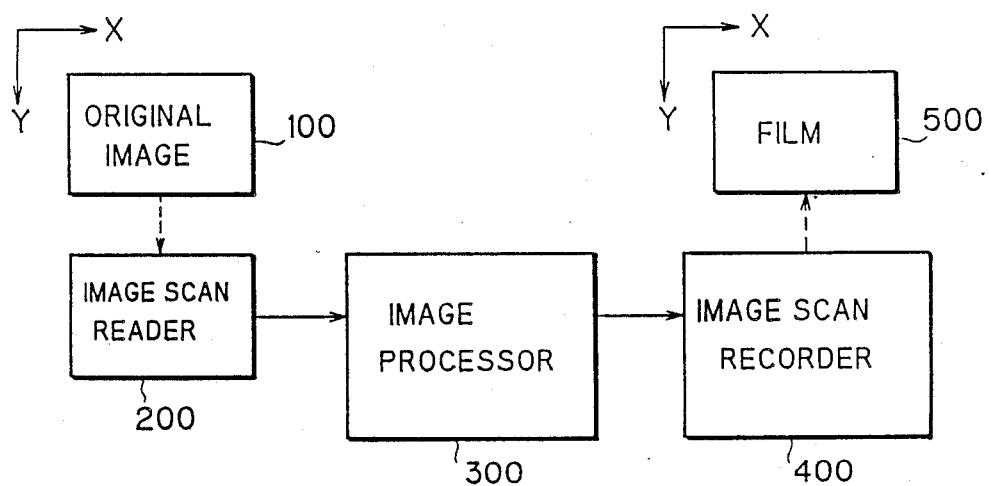
FIG. 1 is a schematic block diagram showing a color process scanner according to a preferred embodiment of the present invention.

FIG. 1 is a schematic block diagram showing a process scanner to which an embodiment of the present invention is applied. An original image 100 is read for each pixel by an image scan reader 200. An image signal thus obtained is transferred to an image processor 300, which in turn performs processing such as sharpness enhancement of the original image 100. The processed image signal is supplied to an image scan recoder 400, which converts the image signal into a halftone dot signal, to record a halftone dot image on a film (scanned plane) 500 through exposure thereof on the basis of the halftone dot signal. Referring to FIG. 1, symbols X and Y denote main scanning and subscanning directions, respectively.

Figure 2:
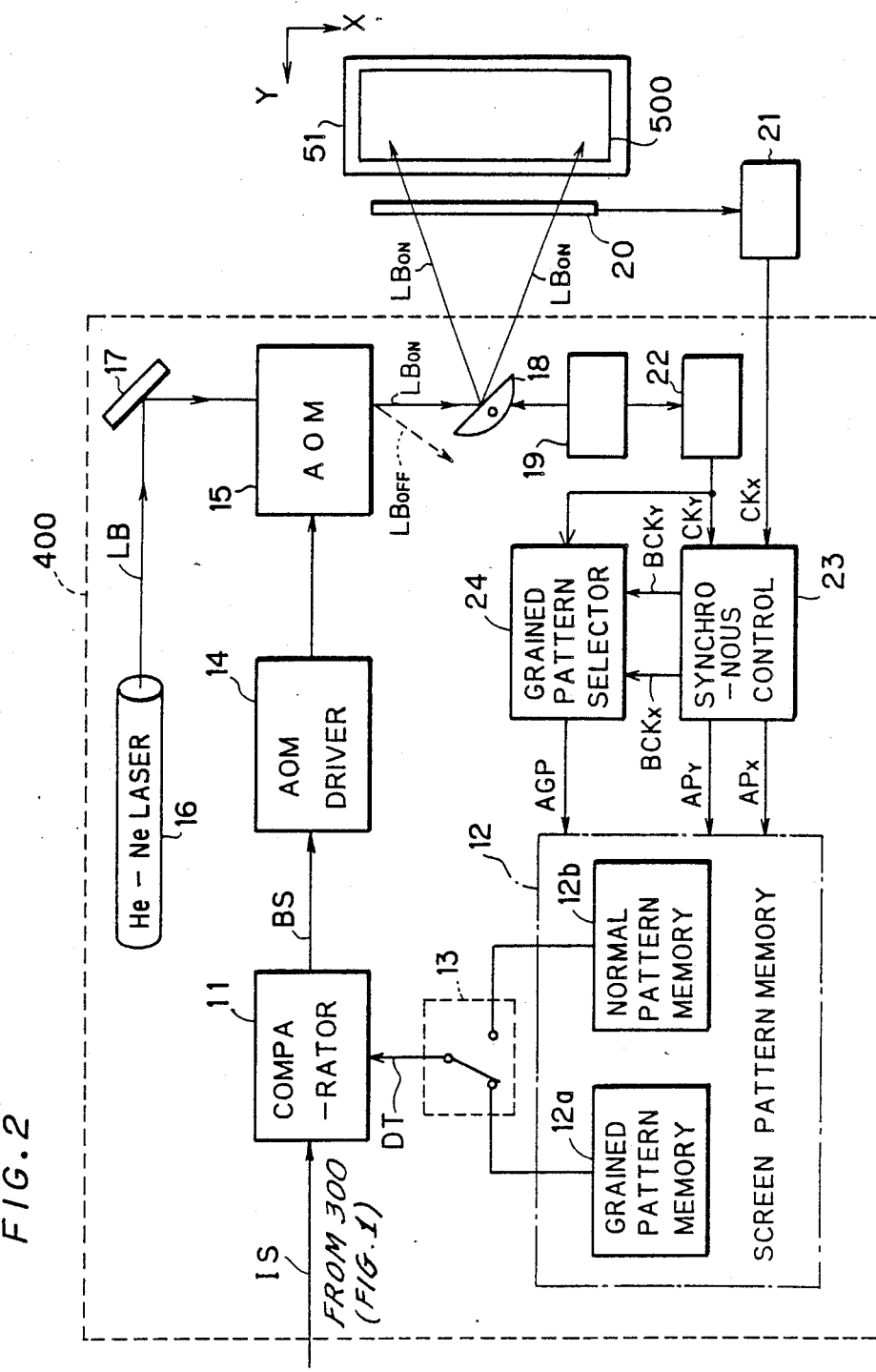
FIG. 2 is a schematic block diagram showing in more detailed form an image scan recorder shown in FIG. 1.

FIG. 2 is a block diagram showing the internal structure of the image scan recorder 400 and peripheral circuits thereof. An image signal IS from the image processor 300 shown in FIG. 1 is inputted in a comparator 11. This comparator 11 also receives a density threshold value DT, which is read from a screen pattern memory 12 through a switch 13. The comparator 11 compares the level of the image signal IS with that of the mentioned threshold value DT for each pixel, to generate a beam control signal BS on the basis of the result of such comparison. A grained pattern memory 12a and a normal pattern memory 12b are provided in the screen pattern memory 12. FIG. 2 shows a state in which the switch 13 connects the comparator 11 and the grained pattern memory 12a.

An acoustic optical modulator (AOM) driver 14 drives an AOM 15 on the basis of the beam control signal BS. A laser beam LB from a He-Ne laser 16 is supplied to the AOM 15 through a mirror 17. When the level of the image signal IS is lower than the density threshold value DT, the laser beam LB is outputted from the AOM 15 as a straight laser beam $LB_{ON}$. The laser beam $LB_{ON}$ is reflected by a galvano mirror 18, to scan the film 500 which is placed on a table 51. The galvano mirror 18 is driven by a mirror driver 19. When the level of the image signal IS is higher than the density threshold value DT, on the other hand, the AOM 15 generates a laser beam $LB_{OFF}$, which is deflected from the galvano mirror 18, so that the film 500 is not exposed by the laser beam $LB_{OFF}$.

The laser beam $LB_{ON}$ scans the film 500 and a grating scale 20, and in response, the grating scale 20 generates a pulse expressing main scanning timing. This pulse is inputted in a pulse-shaping circuit 21, which in turn generates a main scanning clock pulse $CK_x$. The mirror driver 19 generates a pulse which is synchronous with swinging of the galvano mirror 18. This pulse is inputted in another pulse-shaping circuit 22, which in turn generates a subscanning clock pulse $CK_Y$, expressing subscanning timing. The clock pulses $CK_x$ and $CK_Y$ are inputted in a synchronous control circuit 23. The clock pulse $CK_Y$ is also inputted in a grained pattern selector 24.

The synchronous control circuit 23 generates pixel addresses $AP_x$ and $AP_Y$ and block clocks $BCK_x$ and $BCK_Y$ on the basis of the clock pulses $CK_x$ and $CK_Y$, respectively. The pixel addresses $AP_x$ and $AP_Y$ are inputted in the screen pattern memory 12. The block clocks $BCK_x$ and $BCK_Y$ are inputted in the grained pattern selector 24. The grained pattern selector 24 outputs a grained pattern address AGP on the basis of the block clocks $BCK_x$ and $BCK_Y$ and the clock pulse $CK_Y$. Such address generation will be hereinafter described in detail.

B. Structure of Screen Pattern Memory

Figure 3:
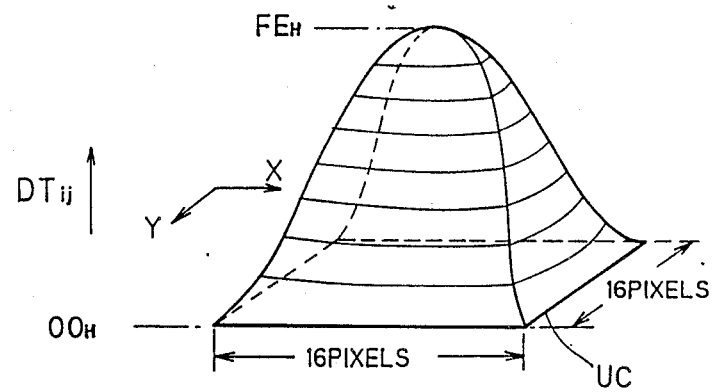
FIG. 3 is a diagram showing a single-peak distribution of density threshold values.

Structure of the screen pattern memory 12 shown in FIG. 2 will be described. FIG. 3 shows distribution of the density threshold values DT in a single-peak screen pattern stored in the normal pattern memory 12b. Such distribution is set for each unit cell UC.

The unit cell UC is in the configuration of a square matrix of 16×16 pixels. Each edge of the unit cell UC is parallel to the corresponding scanning direction X or Y.

A density threshold value $DT_{ij}$ (i, j=1 to 16), which is expressed in eight bits, is assigned to the corresponding pixel belonging to the 16×16 matrix. The density threshold value $DT_{ij}$ reaches the maximum value $[FE]_H$ (hexadecimal number) at the center of the unit cell UC, and reaches the minimum value $[00]_H$ at the peripheral edges of the unit cell UC.

Figure 4A:
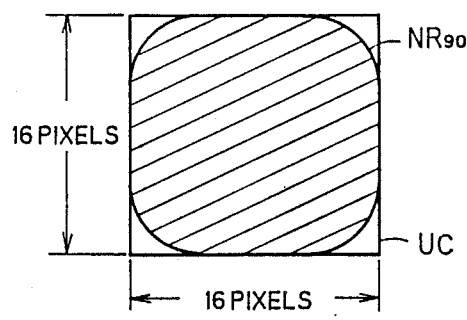
FIGS. 4A-4C are respective diagrams showing an exposed part of a reproduced image at different halfline dot percentages, which are obtained through the distribution of density threshold values shown in FIG. 3.
Figure 4B:
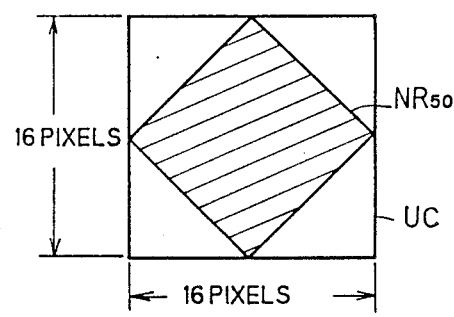
Figure 4C:
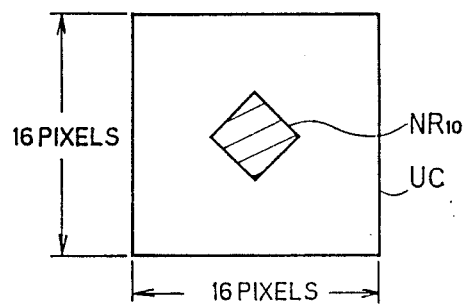

FIGS. 4A, 4B and 4C are respective diagrams showing states that image signals ISs indicating halftone dot percentages 90%, 50% and 10% are applied to the screen pattern shown in FIG. 3, respectively.

Referring to FIGS. 4A, 4B and 4C, regions $NR_{90}$, $NR_{50}$ and $NR_{10}$ with slanting lines are exposed by the laser beam $LB_{ON}$. The area of the exposed region is reduced with decrease in halftone dot percentage.

Figure 5:
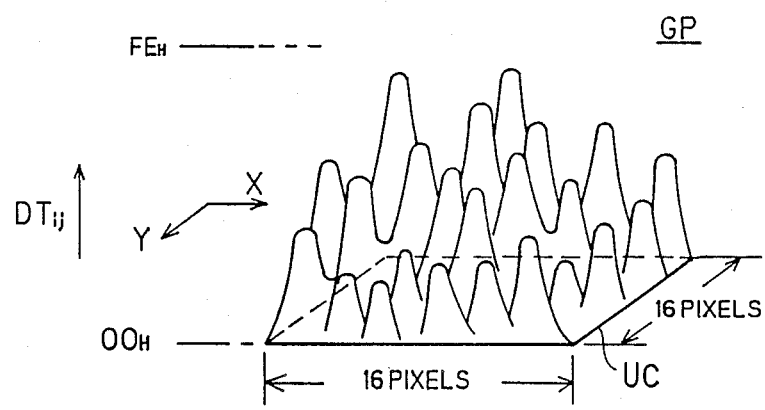
FIG. 5 is a diagram showing a grained pattern of density threshold values.

FIG. 5 illustrates distribution of the density threshold values DT in one of grained patterns stored in the grained pattern memory 12a. The unit cell UC is a matrix of 16×16 pixels. The density threshold values DT corresponding to the respective pixels are within a range (show vertically) of $[00]_H$ to $[FE]_H$. The density threshold values $DT_{ij}$ are in random distribution, which is obtained by randomly distributing all levels belonging to this range on the unit cell UC.

Figure 6A:
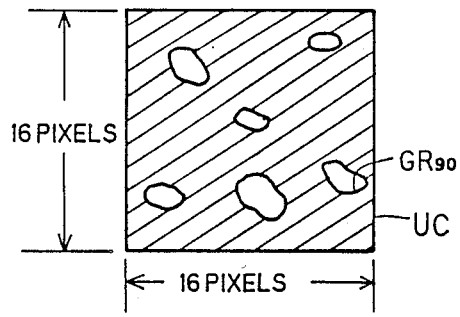
FIGS. 6A-6C are respective diagrams showing an exposed part of a reproduced image at different halftone dot percentages, which are obtained through the distribution of density threshold values shown in FIG. 5.
Figure 6B:
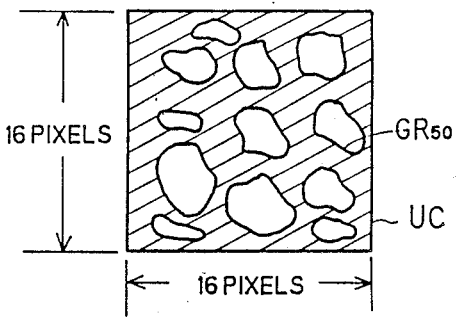
Figure 6C:
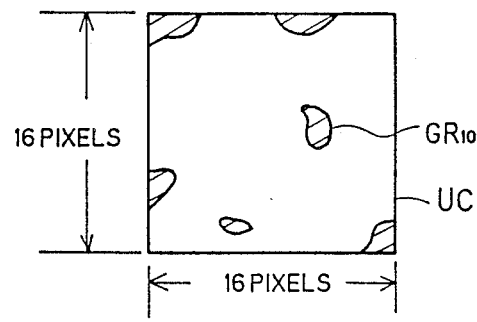

FIGS. 6A, 6B and 6C are respective diagrams showing states that the image signals ISs indicating the halftone dot percentages 90%, 50% and 10% are applied to the grained pattern shown in FIG. 5, respectively. Similarly to FIGS. 4A, 4B and 4C, grained regions $GR_{90}$, $GR_{50}$ and $GR_{10}$ shown with slanting lines are to be exposed. The area of the exposed region is also reduced with decrease in halftone dot percentage.

FIG. 7 shows an exemplary numerical distribution of density threshold values DT in a grained pattern. The density threshold values DT are randomly assigned to the pixels belonging to the 16×16 matrix in the unit cell UC. The grained pattern memory 12a shown in FIG. 2 stores a plurality of grained patterns, which are different in distribution of density threshold values from each other. A grained pattern address AGP from the grained pattern selector 24 randomly selects one of the plurality of grained patterns for each unit cell UC on the film 500.

C. Process

The process being conducted in the image scan recorder 400 shown in FIG. 2 will be now described. This process includes a step of converting a pulse generated by scanning into an address signal and a step of randomly assigning a grained pattern GP to each unit cell UC in response to the address signal.

Figure 8:
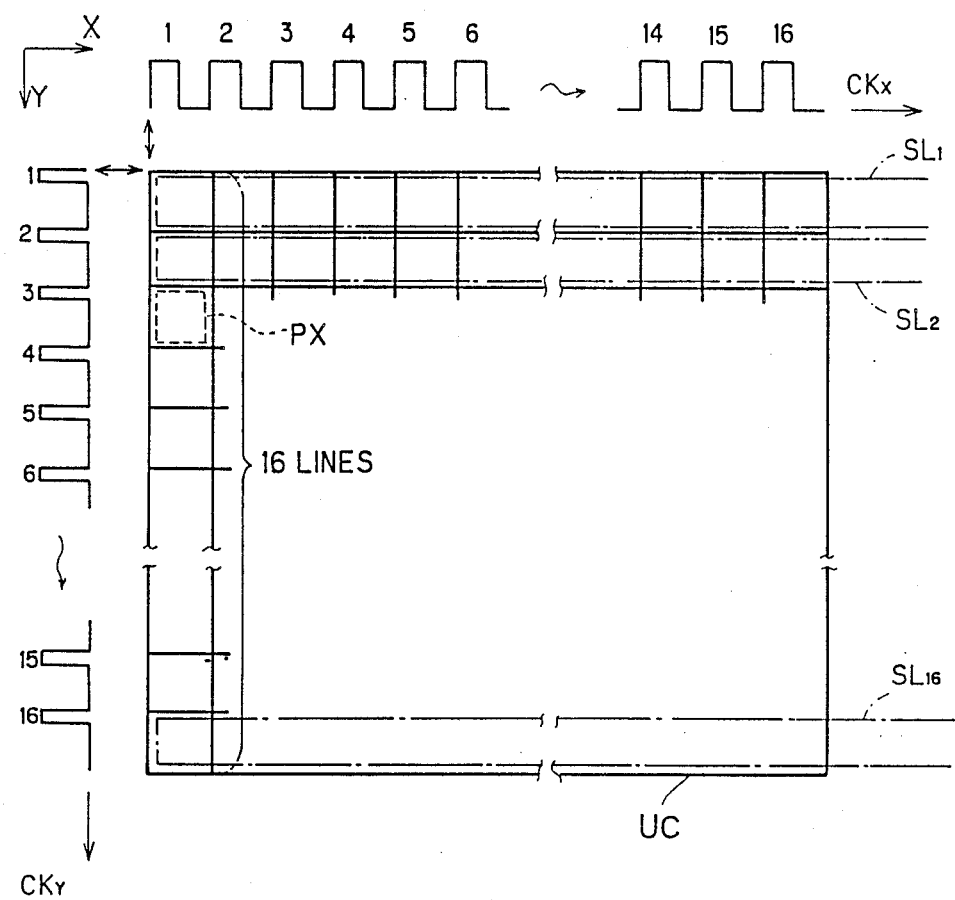
FIG. 8 is a diagram showing a positional relationship between unit cells, scanning lines and pixels.

FIG. 8 illustrates the relation between each pixel PX in the unit cell UC and the aforementioned clock pulses $CK_x$ and $CK_y$. Main scanning is performed along a scanning line $SL_1$ extending in the main scanning direction X. This scanning line $SL_1$ includes not only pixels belonging to the first line in the illustrated unit cell US but also pixels of respective first lines of other unit cells UC (not shown) arranged along the main scanning direction X. The clock pulse $CK_x$ is generated every time the apparatus scans one of the pixels PX in the main scanning direction X.

When the first scanning line $SL_1$ is completely scanned, main scanning along a second scanning line $SL_2$ is started. The subscanning clock $CK_Y$ is generated with such change of the scanning lines SL. When scanning along a 16th scanning line $SL_{16}$ is terminated, scanning of the unit cell UC shown in FIG. 8 is completed.

Figure 9:
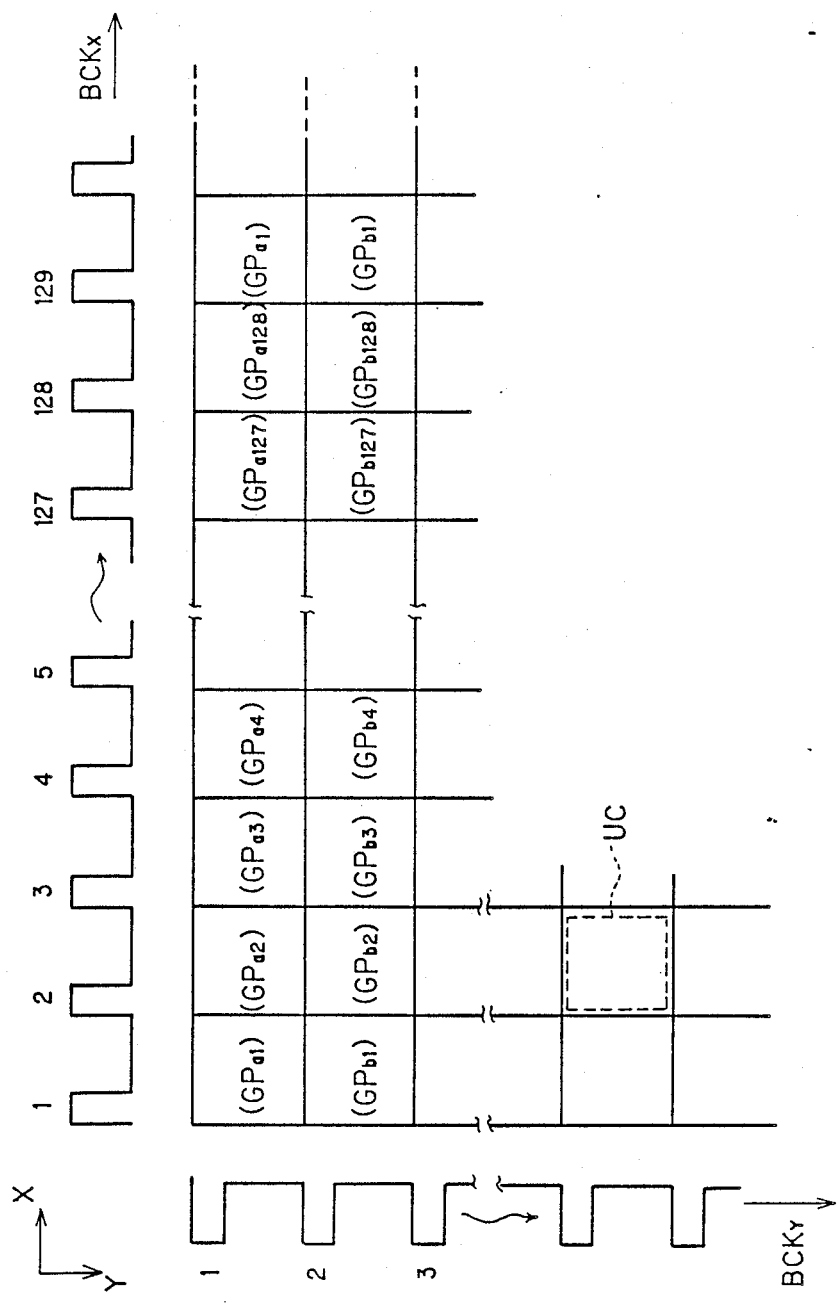
FIG. 9 is a diagram showing unit cells and respective grained patterns.

FIG. 9 illustrates an arrangement of a plurality of unit cells UC. The unit cells UC are arranged in parallel along both of the main scanning direction X and the subscanning direction Y. The block clocks $BCK_x$ and $BCK_Y$ identify respective ones of the unit cells UC. The block clocks $BCK_x$ and $BCK_Y$ are generated for every 16 ones of the clock pulses $CK_x$ and $CK_Y$ shown in FIG. 8, respectively.

The screen pattern memory 12a shown in FIG. 2 stores, for example, 128 grained patterns $GP_k$ (k=1 to 128). The grained patterns $GP_k$ (k=1 to 128) are different from each other, and randomly assigned to respective ones of the unit cells UC. Grained patterns $GP_{a1}$ to $GP_{a128s}$ addressed by a first series of random numbers $RN_a$ ($RN_{a1}$ to $RN_{a128}$) (not shown), are assigned to first to 128th unit cells UC on the first line. These grained patterns $GP_{a1}$ to $GP_{a128}$ are in one-to-one random correspondence to previously prepared grained patterns $GP_k$ (k=1 to 128). The random correspondence is specified by the series of random numbers $RN_a$ ($RN_{a1}$ to $RN_{a128}$).

The grained patterns $GP_{a1}$ to $GP_{a128}$ are re-assigned to 129-th to 256-th unit cells UC on the first line. Such operation is performed by generating the same address for every 128 block clocks $BCK_x$.

Grained patterns $GP_{b1}$ to $GP_{b128}$, addressed by a second series of random numbers $RN_b$ ($RN_{b1}$ to $RN_{b128}$), are assigned to first to 128th unit cells UC on a second line. The grained patterns $GP_{b1}$ to $GP_{b128}$ are also in one-to-one random correspondence to the grained patterns $GP_k$ (k=1 to 128). The random correspondence is specified by the second series of random numbers $RN_b$ ($RN_{b1}$ to $RN_{b128}$). Since the aforementioned first series of random numbers $RN_a$ ($RN_{a1}$ to $RN_{a128}$) and the second series of random numbers $RN_b$ ($RN_{b1}$ to $RN_{b128}$) are different from each other, the grained patterns $GP_k$ (k=1 to 128) are assigned to the unit cells UC in accordance with rules which are varied with the lines of the unit cells UC. Thus, avoided is such a phenomenon that a reproduced image has undesirable periodicity.

Figure 10:
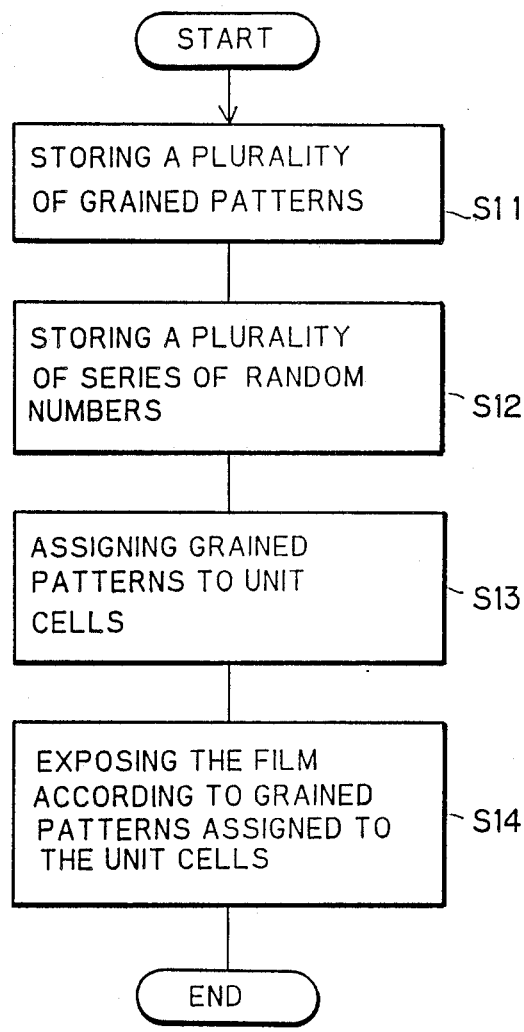
FIG. 10 is a flow chart showing a method of producing a halftone dot image according to a preferred embodiment of the present invention.

FIG. 10 is a flow chart showing the aforementioned process. First, a plurality of (128 in this case) of different grained patterns GP are stored in the memory 12a at a step S11.

At a step S12, a plurality of series of random numbers RN (formed by numerical values "1" to "128") are stored in a memory provided in the selector 24 (FIG. 2).

At a step S13, the grained patterns GP are assigned to the unit cells UC. The rules of such assignment are decided by the series of random numbers RN. The number of such rules of assignment is increased as the series of random numbers RN are increased in number.

At a step S14, the film 500 is exposed according to the image signal IS and the grained patterns GP assigned to the unit cells UC at the step S13.

Actual exposure is performed sequentially along scanning lines. Therefore, assignment of the grained patterns GP is performed in parallel with the exposure. The exposure on the scanning lines is performed while sequentially reading out the grained patterns GP assigned to the respective unit cells UC from the memory 12a. Such an exposing step will be described in detail in the following section.

D. Circuit Structure

Figure 11:
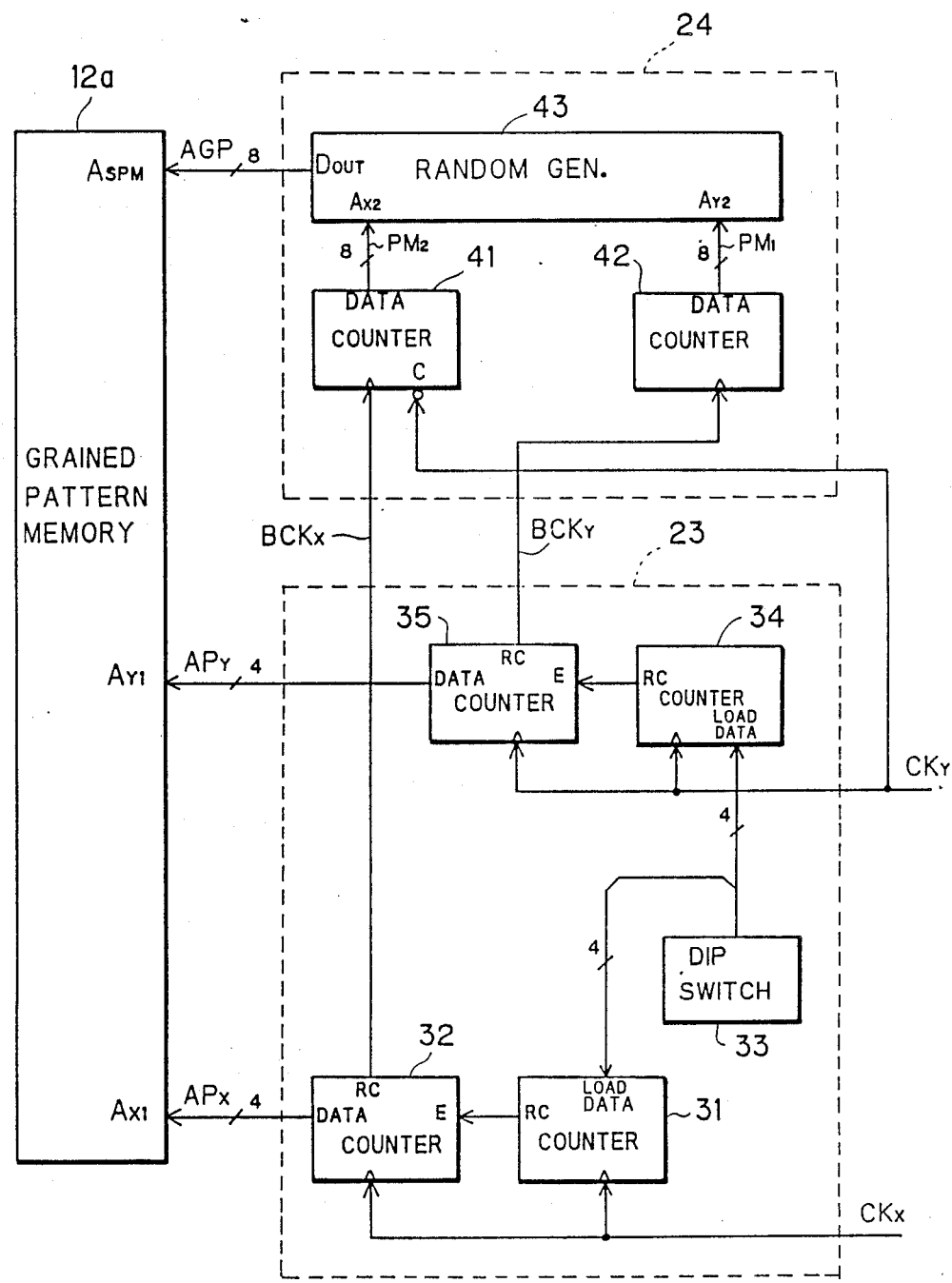
FIG. 11 is a diagram showing an internal structure of a synchronous controller and a random number generator.

FIG. 11 is a block diagram showing a circuit according to an embodiment of the present invention, which is adapted to implement the aforementioned processing. This block diagram shows detailed structure of the grained pattern memory 12a, the synchronous control circuit 23 and the grained pattern selector 24 shown in FIG. 2.

The main scanning clock pulse $CK_x$ is inputted in respective clock input terminals of a first frequency-dividing counter 31 and a first pixel counter 32 in the synchronous control circuit 23. The frequency-dividing counter 31 is supplied at its LOAD DATA terminal with four-bit data for setting a frequency-dividing ratio from a DIP switch 33. Assuming that the frequency-dividing ratio is set at "1", a pulse of the same repitation cycle with the clock pulse $CK_x$ is generated at a ripple carry terminal RC of the counter 31. This pulse is inputted at an enable terminal E of the counter 32, which is a hexadecimal counter. In response to the input at the enable terminal E, the counter 32 counts the pulse inputted in the clock input terminal, to generate four-bit data at its DATA terminal. The four-bit data is inputted at an address terminal $A_{x1}$ of the grained pattern memory 12a, to supply a pixel address $AP_x$ along the main scanning direction X in a grained pattern GP selected by a procedure described below. The counter 32 further generates a ripple carry pulse at its ripple carry terminal RC for every 16 clock pulses $CK_x$. A ripple carry pulse is generated for every cycle of the unit cell UC along the main scanning direction X, to provide the block clock $BCK_x$.

The subscanning clock pulse $CK_Y$ is inputted in respective clock input terminals of a second frequency dividing counter 34 and a second pixel counter 35 which are provided in the synchronous control circuit 23. The counter 34 is supplied at its LOAD DATA terminal with four-bit data for setting a frequency-dividing ratio from the DIP switch 33. Since the frequency-dividing ratio is set at "1" as described above, a pulse of the same repitation cycle with the clock pulse $CK_x$ is generated at a ripple carry terminal RC of the counter 34. This pulse is inputted at an enable terminal E of the counter 35, which is a hexadecimal counter. In response to the input in the enable terminal E, the counter 35 counts the pulse received in its clock input terminal, to generate four-bit data at its DATA terminal. The four-bit data is inputted in an address terminal $A_{Y1}$ of the grained pattern memory 12a, to supply a pixel address $AP_Y$ along the subscanning direction Y in a grained pattern GP selected in accordance with procedure as described below. The counter 35 generates a ripple carry pulse at its ripple carry terminal RC for every 16 clock pulses $CK_Y$. A ripple carry pulse is generated for every cycle of the unit cell UC along the subscanning direction Y, to provide the block clock $BCK_Y$.

The block clock $BCK_x$ from the counter 32 is inputted at a clock input terminal of a first halftone dot area counter 41 in the grained pattern selector 24, while the clock pulse $CK_Y$ is inputted to a clear terminal C. The counter 41 counts the block clock $BCK_x$ from the counter 32, to generate eight-bit data at its DATA terminal. Since the block clock $BCK_x$ is generated every time scanning of one unit cell UC is completed along the main scanning direction X, the eight-bit data shows the number of the unit cells UC along the main scanning direction X.

Since the counter 41 is cleared by the subscanning clock pulse $CK_Y$ every time the scanning line is changed, the same data are supplied from the counter 41 to unit cells UC which are located in the same position along direction X in the different scanning lines. In this embodiment, the counter 41, which is self-reset every 128 counts, generates the same data for every 128 unit cells UC along the main scanning direction X.

The block clock $BCK_Y$ from the counter 35 is inputted at the clock input terminal of a second halftone dot area counter 42. The counter 42 counts the block clock $BCK_Y$, to generate eight-bit data at its DATA terminal. The eight-bit data, which is generated for every unit cell UC along the subscanning direction Y, shows the number of the unit cells UC along the subscanning direction Y. The counter 42 is also self-reset for every 128 counts.

The eight-bit data from the counter 42 is inputted at an input terminal $A_{Y2}$ of a random number generator 43 as a parameter $PM_1$, while the eight-bit data from the counter 41 is inputted at another input terminal $A_{x2}$ of the random number generator 43 as a parameter $PM_2$.

The parameter $PM_1$ is adapted to decide a series of random numbers to be generated, while the parameter $PM_2$ is adapted to sequentially specify random numbers in the series decided by the parameter $PM_1$.

The random number generator 43 generates eight-bit random numbers specified by the parameters $PM_1$ and $PM_2$ at its data output terminal $D_{OUT}$. The random numbers may be generated by a command "RND" which is set in a personal computer language "BASIC", for example.

Alternatively, 128 series of random numbers may be previously written in a ROM, to sequentially read out the random numbers by supplying the parameters $PM_1$ and $PM_2$ as addresses.

The eight-bit random number AGP read from the data output terminal $D_{OUT}$ is supplied to an address terminal $A_{SPM}$ of the grained pattern memory 12a as a grained pattern address AGP. The grained pattern memory 12a selects a grained pattern designated by the random address AGP, to provide a density threshold value DT, which is specified by the addresses $AP_x$ and $AP_Y$ within grained pattern data thus selected.

In this embodiment, the number of the grained patterns GP is "128". Therefore, the most significant bit of the address AGP may not be used. While a sufficient effect can be attained by preparing 128 grained patterns in practice, the number of preparable grained patterns can be increased by increasing the bit number of the address AGP and the capacity of the grained pattern memory 12a. In this embodiment, the grained pattern memory 12a can be formed by a ROM having capacity of 64 kilobytes since the pixels in the unit cell UC are $16 \times 16 = 256$ and the memory stores 128 types of grained patterns.

Count operation performed for each scanning line and each pixel will be now described. When a first pixel $PX_{11}$ of the first scanning line $SL_1$ shown in FIG. 8 is scanned, one clock pulse $CK_x$ is generated from the pulse shaping circuit 21 shown in FIG. 2. The counters 31 and 32 are initialized by the first clock pulse $CK_x$, and initial data [0000] is generated at the DATA terminal of the counter 32. No block clock $BCK_x$ is generated since no ripple carry pulse is generated, and data [00000000] is generated at the DATA terminal of the counter 41.

At the same time, one clock pulse $CK_Y$ is generated from the pulse shaping circuit 22 shown in FIG. 2. The counters 34 and 35 are initialized by the clock pulse $CK_Y$, and initial data [0000] is generated at the DATA terminal of the counter 35. No block clock $BCK_Y$ is generated since no ripple carry pulse is generated, and data [00000000] is generated at the DATA terminal of the counter 42.

The random number generator 43 is supplied with the data [00000000] as a parameter $PM_1$, to generate random numbers belonging to the first series of random numbers. Since a parameter $PM_2$ is the data [00000000], the first one of the first series of random numbers is read out from the random number generator 43, to provide a grained pattern address AGP.

The grained pattern memory 12a selects one grained pattern $GP_{a1}$ which is designated by the address AGP. With respect to the grained pattern $GP_{a1}$, the counter 32 supplies data [0000] as a pixel address $AP_x$ and the counter 35 supplies data [0000] as a pixel address $AP_Y$, respectively. Thus read out is a density threshold value DT, which corresponds to the first pixel $PX_{11}$ on the scanning line $SL_1$ in the grained pattern $GP_{a1}$.

When a second pixel $PX_{12}$ on the scanning line $SL_1$ is scanned, one clock pulse $CK_x$ is generated. The counters 31 and 32 count the clock pulse $CK_x$, and the data appearing at the DATA terminal of the counter 32, i.e., the address $AP_x$ becomes [0001]. Since the other addresses AGP and $AP_Y$ remain unchanged, a density threshold value DT corresponding to the second pixel $PX_{12}$ on the scanning line $SL_1$ in the grained pattern $GP_{a1}$ is read out.

Such operation is continued until a 16-th pixel on the scanning line $SL_1$ is scanned. When a 17-th pixel on the scanning line $SL_1$ is scanned, a 17-th clock pulse $CK_x$ is inputted in the counter 32, which in turn generates one ripple carry pulse so that one block clock $BCK_x$ is inputted to the counter 41. The parameter $PM_2$, which appears at the DATA terminal of the counter 41, becomes data [00000001]. Since the parameter $PM_1$ remains the data [00000000], a second one of the first series of random numbers is read out from the random number generator 43, to provide a grained pattern address AGP. The grained pattern memory 12a selects another grained pattern $GP_{a2}$.

The 17-th to 32-th pixels on the scanning line $SL_1$ are recorded on the basis of the grained pattern $GP_{a2}$, as shown in FIG. 9. Thus, the pixels on the scanning line $SL_1$ are scanned while referring to a corresponding one of the grained patterns $GP_{a1}$ to $GP_{a128}$ for each unit cell UC.

The counter 41 is self-reset when 128 block clocks $BCK_x$ are generated and all of the grained patterns $GP_{a1}$ to $GP_{a128}$ are read out. The grained pattern $GP_{a1}$ is reassigned to a 129-th unit cell UC.

When the pixels on the first scanning line $SL_1$ are completely scanned and scanning of those on a second scanning line $SL_2$ is started, the clock pulse $CK_Y$ is generated once. The counters 34 and 35 count this pulse. Data [0001] showing the second scanning line $SL_2$ is generated at the DATA terminal of the counter 35. The parameter $PM_1$ generated from the counter 42 remains unchanged since no ripple carry pulse is generated. Therefore, random numbers belonging to the first series are read out.

The counter 41 is initialized when the clock pulse $CK_Y$ is inputted in its clear terminal C, to output data [0000]. Similarly to the case of the pixel $PX_{11}$, a density threshold value DT in the grained pattern $GP_{a1}$ is supplied to a first pixel $PX_{21}$ on the scanning line $SL_2$.

The counter 32 is a hexadecimal counter, and the address $AP_x$ is data [0000]. Read out is a density threshold value DT which corresponds to the first pixel $PX_{21}$ on the scanning line $SL_2$ in the grained pattern $GP_{a1}$.

Such operation is continued to a 16-th scanning line $SL_{16}$. With respect to the respective unit cells UC of the first line, the grained patterns $GP_{a1}$ to $GP_{a128}$ are repeatedly read out every time the scanning line is changed.

When scanning of a first pixel on a 17-th scanning line $SL_{17}$ is started, a 17-th clock pulse $CK_Y$ is inputted in the counter 35, which in turn generates one ripple carry pulse, so that one block clock $BCK_Y$ is inputted to the counter 42. The parameter $PM_2$, which is outputted from the counter 42, becomes data [00000001]. Random numbers belonging to the second series are read out from the random number generator 43.

Unit cells UC of a second line formed by the 17-th to 32-th scanning lines $SL_{17}$ to $SL_{32}$ are recorded with reference to grained patterns $GP_{b1}$ to $GP_{b12}$ which are read out in response to the random numbers beloning to the second series in procedure similar to that for the unit cells UC of the first line. The grained patterns $GP_{b1}$ to $GP_{b128}$ are obtained by changing arrangement of the grained patterns $GP_{a1}$ to $GP_{a128}$.

If the number of the series of random numbers is "128", this operation is repeated for every 128 lines of unit cells UC.

As described, above different grained patterns GP are assigned to the unit cells UC. Further, different series of random numbers are assigned to respective lines of the unit cells UC. Thus, screen periodicity in a reproduced image can be suppressed.

If it is desired to record a halftone dot image with the single-peak screen pattern shown in FIG. 3, the comparator 11 (FIG. 2) is connected through the switch 13 to the normal pattern memory 12b in place of the grained pattern memory 12a. The single-peak screen pattern being stored in the normal pattern memory 12b is repeatedly read out, to thereby generate a periodical arrangement of the single-peak screen pattern. The comparator 11 compares the image signal IS with the periodical arrangement for each pixel, whereby a halftone dot image using the periodical arrangement is recorded on the film 500.

Therefore, the present apparatus can record a halftone dot image on the basis of the periodical arrangement of the single-peak screen pattern as well as the random arrangement of the grained screen patterns.

E. Modifications

Figure 12A:
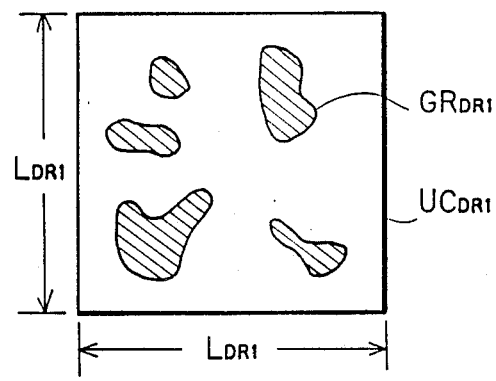
FIGS. 12A and 12B are respective diagrams showing unit cells whose respective sizes are determined according to a dividing ratio being set in a DIP switch.
Figure 12B:
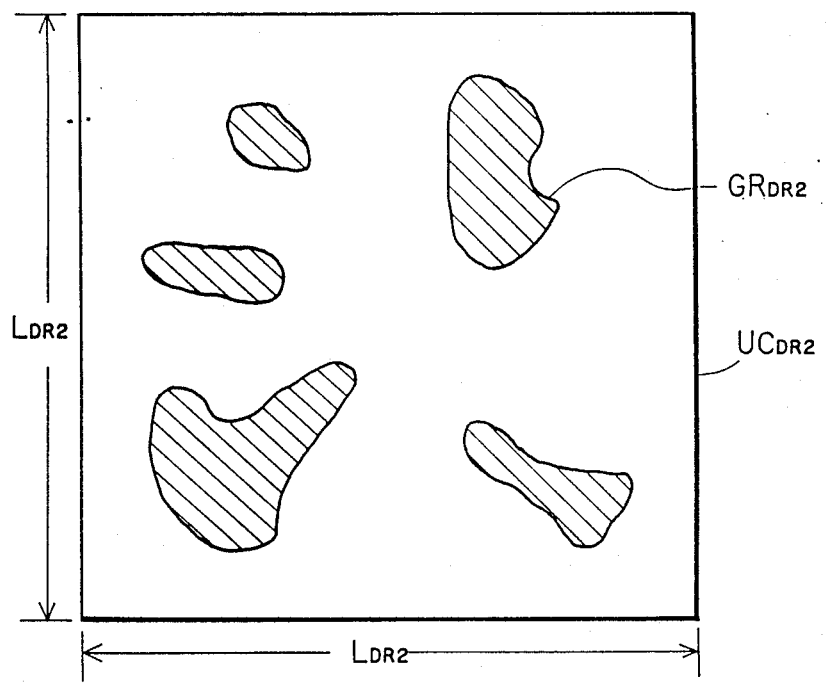

FIGS. 12A and 12B illustrate unit cells $UC_{DR1}$ and $UC_{DR2}$ in the case where the frequency-dividing ratio of the DIP switch 33 shown in FIG. 11 is set at "1" and "2", respectively.

When the frequency-dividing ratio from the DIP switch 33 is set at "2", the aforementioned address generation is performed for every two of clock pulses $CK_x$ ($CK_Y$). If the exposure speed is constant, length $L_{DR2}$ of an edge of the unit cell $UC_{DR2}$ is twice the length $L_{DR1}$ of an edge of the unit cell $UC_{DR1}$. Further, a region $GR_{DR2}$ to be exposed is provided in dimensions obtained by doubling those of a region $GR_{DR1}$ in respective directions.

The present invention is also applicable to a plane type scanner employing a polygon mirror and is also applicable another drum-type scanner and the like.

Although the present invention has been described and illustrated in detail, it is clearly understood that the same is by way of illustration and example only and is not to be taken by way of limitation, the spirit and scope of the present invention being limited only by the terms of the appended claims.

I claim:

1. A method of producing a halftone dot image on the basis of original image data expressing an original image, comprising the steps of:
   (a) preparing grained screen patterns that are different from each other;
   (b) arranging said grained screen patterns in a random order, so as to obtain a random arrangement of said grained screen patterns;
   (c) comparing said original image data with said random arrangement of said grained screen patterns for each pixel and thereby generating a halftone dot signal; and
   (d) producing a halftone dot image on the basis of said halftone dot signal.

2. A method in accordance with claim 1, wherein:
   said halftone dot image is produced through a combination of a main scanning and a subscanning on an image plane;
   said halftone dot image has a plurality of pixels arrayed along a main scanning direction and a subscanning direction; and
   the step (b) includes the step of;
   (b-1) assigning said grained screen patterns to respective parts of said image plane at random in both of said main scanning direction and said subscanning direction, to obtain said random arrangement of said grained screen patterns.

3. A method in accordance with claim 2, wherein:
   said random arrangement has a plurality of subarrangements arranged in said main scanning direction and said subscanning direction;
   said grained screen patterns are arranged in each of said subarrangements at random; and
   said grained screen patterns are arranged in a same random order in all of said subarrangements.

4. An apparatus for producing a halftone dot image on the basis of original image data expressing an original image, comprising:
   (a) a first memory means for storing grained screen patterns that are different from each other;
   (b) a first reading-out means for reading said grained screen patterns from said first memory means in a random order, so as to generate a random arrangement of said grained screen patterns;
   (c) electric means for receiving said random arrangement from said first reading-out means and for generating a screen pattern signal in accordance with said random arrangement;
   (d) comparator means for comparing said original image data with said screen pattern signal and for thereby generating a halftone dot signal; and
   (e) means for producing a halftone dot image on an image plane on the basis of said halftone dot signal.

5. An apparatus in accordance with claim 4, wherein:
   said random arrangement is a two-dimensional arrangement in which said grained screen patterns are assigned at random to respective parts of a two-dimensional area on said image plane.

6. An apparatus in accordance with claim 5, wherein:
   said image plane has a plurality of areas each of which corresponds to said two dimensional area; and
   said random arrangement is common to said plurality of said areas.

7. An apparatus in accordance with claim 6, wherein:
said apparatus further comprises:
(f) a second memory means for storing a signal-peak screen pattern; and
(g) a second reading-out means for reading out said signal-peak screen pattern repeatedly and for thereby generating a periodic arrangement of said signal-peak screen pattern; and
said electric means includes:
(c-1) selector means for selecting one of said random arrangement and said periodic arrangement and for generating said screen pattern signal in accordance with the selected arrangement.

8. A halftone dot generator for generating a halftone dot signal on the basis of original image data expressing an original image, said halftone dot signal being employable for producing a halftone dot image on an image plane, said image plane having an array of areas, said halftone dot generator comprising:
(a) memory means for storing grained screen patterns that are different from each other, each of said grained screen patterns having a plurality of threshold values;
(b) means for selecting one pixel from a plurality of pixels defined on said image plane;
(c) means for specifying one area of said image plane to which said one pixel belongs;
(d) means for specifying a coordinate of said one pixel on said one area;
(e) means for selecting one grained screen pattern at random from said grained screen patterns stored in said memory means;
(f) means for selecting one threshold value in response to said coordinate from the plurality of threshold values included in said one grained screen pattern;
(g) comparator means for comparing said original image data for said one pixel with said one threshold value and for thereby generating a halftone dot signal for said one pixel; and
(h) means for enabling said means (b) through (q) repeatedly while serially selecting said one pixel from said plurality of pixels under the condition where a same grained screen pattern is selected for pixels belonging to a same area within said array of areas.

9. A halftone dot generator in accordance with claim 8, wherein:
said halftone dot image is produced on said image plane through scan of said image plane;
said means (b) includes:
(b-1) means synchronized with said scan for generating a clock pulse indicative of said one pixel, and
said means (d) includes:
(d-1) means for counting said clock pulse to generate a coordinate signal indicative of said coordinate.

10. A halftone dot generator in accordance with claim 9, wherein:
said means (d-1) has an N-bits counter means for counting said clock pulse, where N is a positive integer; and
said means (c) includes:
(c-1) means for generating a pulse signal every time said N-bits counter means counts up $2^N$, said one area being specified by said pulse signal.

11. A halftone dot generator in accordance with claim 10, wherein:
said means (c) further includes:
(c-2) means for counting said pulse signal to generate a count signal;
(c-3) a random number generator for generating a random number in response to said count signal; and
(c-4) means for transmitting said random number to said memory means as an address signal for selecting said one grained screen pattern from said grained screen patterns stored in said memory means.

12. A halftone dot generator in accordance with claim 11, wherein:
said random number generator includes:
(c-3-1) a random number memory for storing a plurality of random numbers; and
(c-3-2) means for delivering said count signal to said random number memory as an address signal to extract said random number from said plurality of said random numbers.

* * * * *